United States Patent
Angus et al.

(10) Patent No.: US 9,444,849 B2
(45) Date of Patent: Sep. 13, 2016

(54) ENFORCING POLICY COMPLIANCE ON A DEVICE

(71) Applicant: The Boeing Company, Chicago, IL (US)

(72) Inventors: Ian G. Angus, Mercer Island, WA (US); Travis S. Reid, Seattle, WA (US)

(73) Assignee: The Boeing Company, Chicago, IL (US)

(*) Notice: Subject to any disclaimer, the term of this patent is extended or adjusted under 35 U.S.C. 154(b) by 17 days.

(21) Appl. No.: 14/506,773

(22) Filed: Oct. 6, 2014

(65) Prior Publication Data
US 2016/0099969 A1 Apr. 7, 2016

(51) Int. Cl.
*H04L 29/06* (2006.01)
*H04L 9/32* (2006.01)

(52) U.S. Cl.
CPC ............ *H04L 63/20* (2013.01); *H04L 9/3268* (2013.01); *H04L 63/0823* (2013.01)

(58) Field of Classification Search
CPC . H04L 9/3294; H04L 63/0823; H04L 63/20; H04L 9/3268

USPC .................................................... 713/158
See application file for complete search history.

(56) References Cited

U.S. PATENT DOCUMENTS

| | | | |
|---|---|---|---|
| 7,793,096 B2* | 9/2010 | Hurst | H04L 63/20 713/150 |
| 2012/0167089 A1* | 6/2012 | Vermande | G06F 21/57 718/1 |

* cited by examiner

*Primary Examiner* — Kambiz Zand
*Assistant Examiner* — Aubrey Wyszynski
(74) *Attorney, Agent, or Firm* — Kunzler Law Group, PC

(57) ABSTRACT

Disclosed herein is a method for enforcing policy compliance on a device that includes detecting a compliance action associated with an electronic device. The compliance action initiates verification that the electronic device is in compliance with a policy. The method also includes sending configuration information for the electronic device to a compliance authenticator in response to the compliance action. The compliance authenticator verifies that the configuration information complies with a policy. Further, the method includes receiving an authentication certificate in response to the compliance authenticator verifying the configuration information complies with the policy. The authentication certificate expires after a predetermined period of time.

22 Claims, 6 Drawing Sheets

ENFORCING POLICY COMPLIANCE ON A DEVICE

FIELD

This disclosure relates to authenticating devices, and more particularly to authenticating devices by enforcing policy compliance on the devices.

BACKGROUND

Resources on a computing network, such as servers, or files/folders located on servers, may be accessible to devices over a data network. Some of these resources may use devices that are seeking access to present authentication credentials that indicate that they are authorized to access the server and/or information on the server. An organization may issue authentication credentials to these devices after determining the devices should be allowed to access resources on the computing network.

Authentication credentials may expire only after an extended time period or never at all, which may allow devices to perpetually access resources on the computing network. Over time, devices may be infected with malware, viruses, or other malicious software that may be used to misappropriate data on the computing network by using the authentication credentials of the device.

SUMMARY

The subject matter of the present application has been developed in response to the present state of the art, and in particular, in response to the problems and needs of authenticating devices by enforcing policy compliance on the devices. For example, conventional methods for authenticating a device may involve issuing long-term authentication certificates without regularly checking the device to ensure it is in compliance with a policy. This may apply especially in situations where the granting of authentication credentials is not a function of determining whether a device should be allowed to access resources on the computing network, e.g., by determining whether the device is infected with malicious software. In general, the subject matter of the present application has been developed to provide an apparatus, method, and computer program product for enforcing policy compliance on a device that overcomes at least some of the above-discussed shortcomings of the prior art.

According to one embodiment, a method includes detecting a compliance action associated with an electronic device. In some embodiments, the compliance action initiates verification that the electronic device is in compliance with a policy. In certain implementations, the method includes sending configuration information for the electronic device to a compliance authenticator in response to the compliance action. The compliance authenticator, in various embodiments, verifies that the configuration information complies with a policy. Further, in one embodiment, the method includes receiving an authentication certificate in response to the compliance authenticator verifying the configuration information complies with the policy. The authentication certificate, in a further embodiment, expires after a predetermined period of time.

In one embodiment, the method includes invalidating the authentication certificate in response to the electronic device becoming not compliant with the policy. In some implementations, invalidating the authentication certificate comprises deleting a key associated with the authentication certificate.

In some embodiments, the electronic device becomes not compliant with the policy in response to determining the electronic device performs an unauthorized action. In one embodiment, the method includes accessing a secure resource of a computer system for an organization in response to the authentication certificate for the electronic device being validated.

In a further implementation, the organization comprises an airline and the electronic device comprises a maintenance device managed by the airline. In some embodiments, the secure resource that is accessed by the maintenance device includes a secure resource of an airplane. In certain embodiments, the method includes storing a key for the authentication certificate in a trusted platform module (TPM) of the electronic device. In various embodiments, the method includes storing one or more configuration values for the electronic device in the TPM. In one implementation, the key for the authentication certificate is usable in response to the stored configuration values matching predetermined configuration values for the electronic device. In certain embodiments, the compliance authenticator comprises a mobile device manager (MDM) that is configured to run a health check on the configuration information in order to verify the configuration information complies with the policy.

In various embodiments, the predetermined period of time is a function of a predefined amount of time for the electronic device to complete a task associated with the authentication certificate. In some embodiments, the compliance action comprises one or more of connecting to an authorized network; registering the electronic device with a compliance device, which can be the client authenticator; installing a compliance application; and scanning the electronic device for malicious applications. In a further embodiment, the configuration information comprises one or more of information associated with applications installed on the electronic device; information associated with a hardware configuration of the electronic device; and information associated with an operating system of the electronic device.

In certain embodiments, the configuration information comprises one or more hash values, the one or more hash values being generated based on a configuration of the electronic device. In some embodiments, the method further includes presenting a message on the electronic device that the electronic device is not in compliance with the policy. In one embodiment, the message is presented in response to expiration of the authentication certificate and/or deletion of a key associated with the authentication certificate According to one embodiment, an apparatus includes a data module configured to receive configuration information associated with an electronic device in response to detecting a compliance action executed by the electronic device. In some embodiments, the apparatus includes a verification module configured to verify that the configuration information complies with a policy. In a further embodiment, the apparatus includes a certificate module configured to issue an authentication certificate to the electronic device in response to verifying that the configuration information complies with the policy. In some embodiments, the authentication certificate expiring after a predetermined period of time.

In certain implementations, the apparatus further includes a compliance module configured to determine one or more authorized actions for the electronic device. In some embodiments, the policy comprises the one or more authorized actions. In one embodiment, the compliance module is further configured to update the policy and send the updated policy to the electronic device. In certain embodiments, the verification module comprises a mobile device manager (MDM), the MDM configured to run a health check on the configuration information in order to verify the configuration information complies with the policy.

In some embodiments, the health check comprises performing one or more verification actions related to the configuration information. In certain embodiments, the verification actions comprise determining applications installed on the electronic device, determining a hardware configuration for the electronic device, and/or determining an operating system configuration for the electronic device. In some embodiments, the certificate module comprises a certificate authority for an airline that created the policy. In certain implementations, the certificate authority issues an authentication certificate that authorizes the electronic device to access a secure resource of an airplane computer system. In a further embodiment, the predetermined period of time is a function of a predefined amount of time for the electronic device to complete a task associated with the authentication certificate.

According to one embodiment, a computer program product comprising a computer readable storage medium is disclosed. In certain embodiments, the computer readable storage medium stores computer usable program code executable to perform operations that include detecting a compliance action associated with an electronic device. In some embodiments, the compliance action initiates verification that the electronic device is in compliance with a policy. The operations, in some embodiments, includes sending configuration information for the electronic device to a compliance authenticator in response to the compliance action. The compliance authenticator, in various embodiments, verifies that the configuration information complies with a policy. The operations, in a further embodiment, includes receiving an authentication certificate in response to the compliance authenticator verifying the configuration information complies with the policy. The authentication certificate, in a further embodiment, expires after a predetermined period of time.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
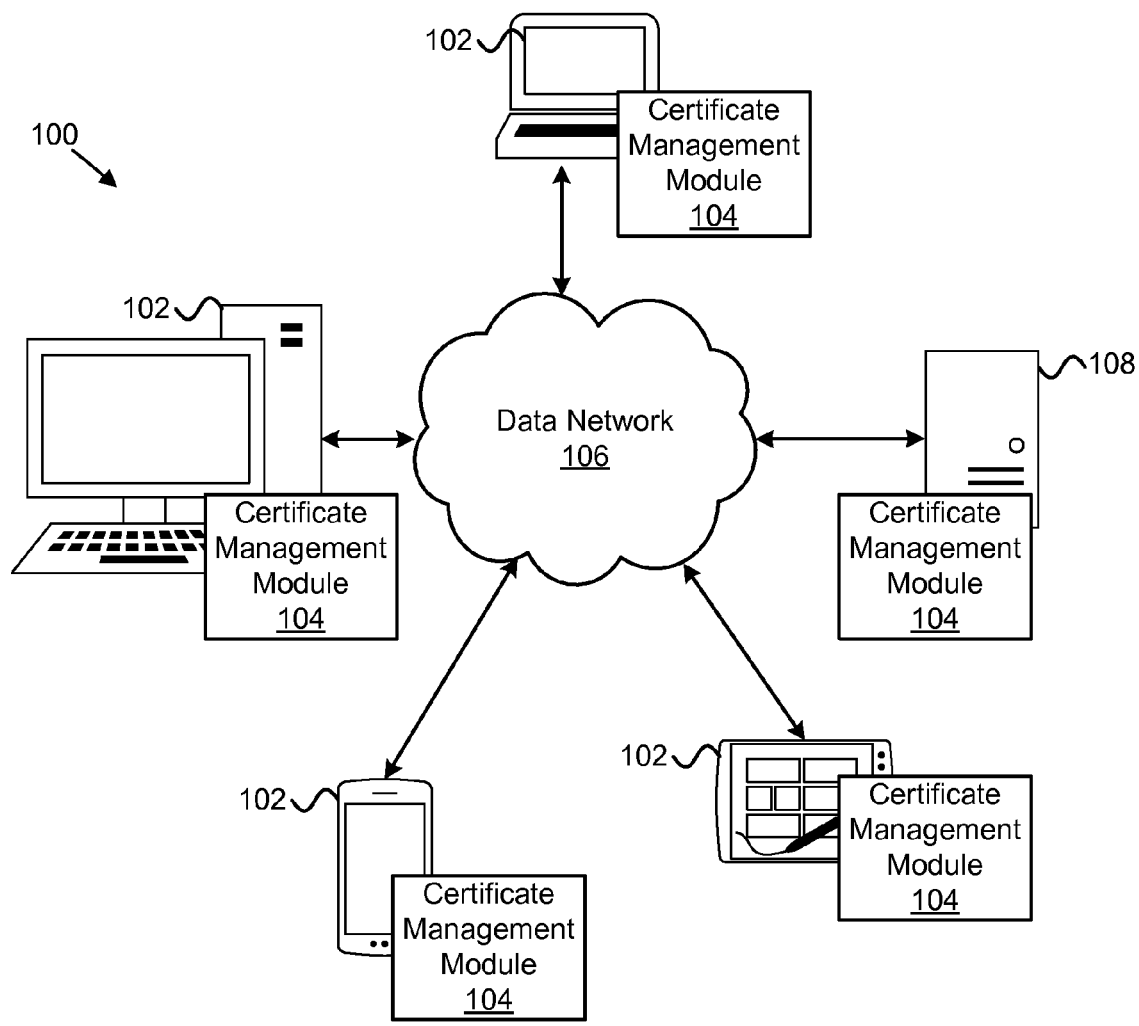
FIG. 1 is a schematic block diagram illustrating one embodiment of a system for enforcing policy compliance on a device.

FIG. 1 illustrates one embodiment of a system 100 for enforcing policy compliance on a device. The system 100 includes electronic devices 102, certificate management modules 104, data networks 106, and servers 108, which are described in more detail below.

The electronic devices 102 include information handling devices, such as laptop computers, tablet computers, smart phones, wearable devices (e.g., smart watches, optical head-mounted displays), and/or the like. Additionally, the electronic devices 102 may include various operating systems, such as different versions of mobile and desktop operating systems provided by Microsoft®, Apple®, Linux®, Android®, and/or the like. For example, the electronic devices 102 may include a laptop computer executing a version of Apple OSX®, Microsoft Windows®, UNIX®, Linux, or the like. In certain embodiments, the electronic devices 102 execute one or more different applications running within the operating systems. The electronic devices 102 may also have various software and/or hardware configurations, which may include various methods of connecting to a data network 106, including Ethernet, Wi-Fi, Bluetooth®, near-field communication (NFC), and/or the like.

The electronic devices 102 can be managed by an organization or corporation, such as, for example, an airline, an investment firm, a hospital, and/or the like. In such an embodiment, the electronic devices 102 may be limited to a software and/or hardware configuration determined by the organization. The configuration may be defined in an organizational policy associated with various electronic devices 102. For example, an airline may specify in its policy that a maintenance device, such as a maintenance laptop for an airplane, may only install programs from a predetermined list or may only connect to certain networks or gateways with specific IP addresses.

The electronic devices 102 are configured to generate, store, maintain, receive, and/or the like, private or public keys, authentication certificates, such as digital certificates, digital signatures, and/or the like. As used herein, an authentication certificate, such as a digital certificate, is an electronic document that allows a person, device, or organization to exchange information securely over a data network 106. In certain embodiments, an authentication certificate includes various information that proves ownership of a public or private key, such as information about the key (e.g., the key itself, the purpose of the key, etc.), information about the key's owner, the digital signature of an entity issuing the key, the expiration date, and/or the like. The authentication certificate may be referred to as a public key certificate in embodiments where it is generated and used within a public key infrastructure (PKI). The generation and use of the authentication certificate is described in more detail below.

The system 100 includes one or more certificate management modules 104. The certificate management modules 104 are configured to detect execution of a compliance action associated with an electronic device 102, which initiates verification that the electronic device 102 is in compliance with a policy. Further, the certificate management modules 104 send configuration information for the electronic device 102 from the electronic device 102 to a compliance authenticator in response to the compliance action. The certificate management modules 104 may receive an authentication certificate, including its corresponding key, in response to the compliance authenticator verifying the configuration information complies with the policy. In this manner, an electronic device 102 may access certain resources, such as servers, computers, mainframes, networks, and/or the like, of a secure computing system associated with the authentication certificate in response to a configuration of the electronic device 102 complying with a predetermined policy. The certificate management module 104 is described in more detail below with reference to FIGS. 2 and 3.

The system 100 includes a data network 106. The data network 106 can be a digital communication data network that transmits digital communications between the electronic devices 102 and/or servers 108. The data network 106 may include a wireless network, such as a wireless telephone network, a local wireless network, such as a Wi-Fi network, a Bluetooth® network, a near-field communication (NFC) network, and the like. The data network 106 may include a wide area network (WAN), a storage area network (SAN), a local area network (LAN), an optical fiber network, the Internet, an intranet, or other network known in the art. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the system 100 includes one or more servers 108. The servers 108 include main frame computers, desktop computers, laptop computers, cloud servers, virtual servers, smart phones, tablet computers, and/or the like. The servers 108 may include computer readable storage media, such as hard disk drives, optical drives, non-volatile memory, RAM, or the like. Additionally, the servers 108 can be configured to store data in one or more data storage areas associated with the computer readable storage media, such as data repositories, databases, data partitions, and/or the like.

The electronic devices 102 are communicatively coupled to the servers 108 through the data network 106. Moreover, the electronic devices 102 access data stored on the servers 108 through the data network 106. In some embodiments, the servers 108 are communicatively coupled to other servers 108 through the data network 106. The servers 108 may be part of a secure computing environment and may demand one or more electronic devices 102 to be authenticated before allowing access to data stored on the servers 108. The servers 108 may use PKI, or a similar cryptographic protocol for authentication, to verify that an electronic device 102 is authorized to access the server 108 by checking an authentication certificate, such as a digital certificate, located on the electronic device 102. The servers 108 may comprise a mobile device manager, a certificate authority, a maintenance server, a compliance authenticator, a classified server, and/or the like, for an organization.

Figure 2:
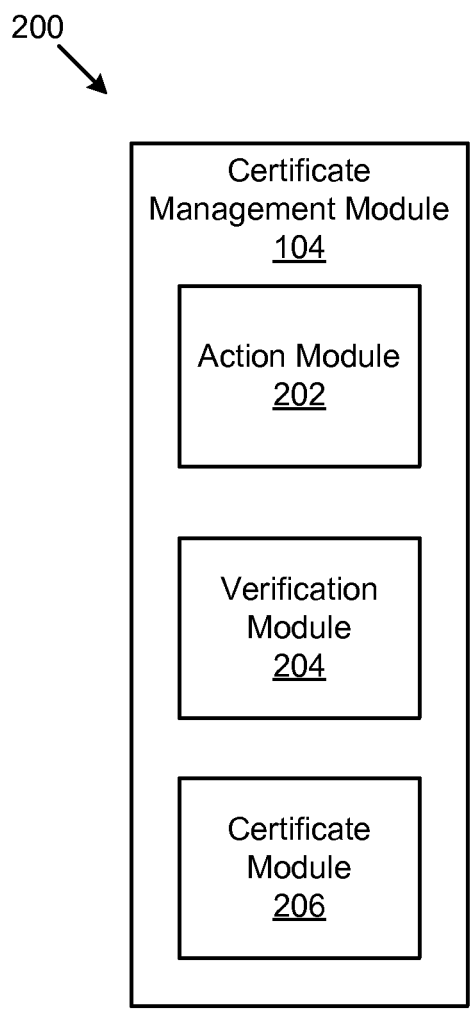
FIG. 2 is a schematic block diagram illustrating one embodiment of a module for enforcing policy compliance on a device.

FIG. 2 illustrates one embodiment of a module 200 for enforcing policy compliance on a device. The module 200 includes an implementation of a certificate management module 104. The certificate management module 104 includes an action module 202, a verification module 204, and a certificate module 206, which are described in more detail below.

The action module 202 detects a compliance action associated with an electronic device 102. In some embodiments, the compliance action initiates verification that the electronic device is in compliance with a policy. As used herein, a compliance action comprises an action performed on, or associated with, an electronic device 102 that initiates a compliance verification process for the electronic device 102.

A compliance action may include connecting to an authorized network, registering the electronic device with a compliance device, which can be a client authenticator, installing a compliance application, scanning the electronic device for malicious software, and/or the like. For example, the action module 202 may detect when a maintenance laptop for an airplane connects to an authorized network, such as an intranet for the airline that manages the laptop. In response to detecting the maintenance laptop connecting to the network, the action module 202 may initiate a compliance verification process for the maintenance laptop.

As described in more detail below, the action module 202 initiates a compliance verification process for the electronic device 102 in order to determine whether the electronic device 102 is compliant with a policy. As used herein, a policy may specify one or more authorized features, software/hardware configurations, applications, user actions and/or the like for an electronic device 102. For example, a policy may specify that a smart phone managed by a hospital may only connect to networks within a predefined IP address range, and may only install applications from a predefined list. Accordingly, the specifications of a policy may be determined by an organization, corporation, and/or the like, and an organization may manage various policies based on the types of devices 102 being used, the departments that are using the devices 102, the tasks performed by the devices 102, and so forth.

The verification module 204 is configured to send configuration information from the electronic device 102 to a compliance authenticator, such as a compliance server 108, in response to the compliance action. Moreover, the verification module 204 collects configuration data from the electronic device 102, which may include software and/or hardware configuration data. In some embodiments, the software configuration data may include operating system information, such as the type of operating system, the version of the operating system, network settings for the operating system, security settings for the operating system, and/or the like. The software configuration data may also include application configuration data for an electronic device 102, such as which applications are installed on the device 102, the permissions each application has been given, network access associated with the applications, and/or the like. Hardware configuration data may include information regarding network interface controllers (NICs) that are installed on the device, processor information, memory information, information about physical access ports, and/or the like.

In some embodiments, the verification module 204 and/or the data module 302 (described below with reference to FIG. 3) generates one or more hash values, files of hash values, or the like based on the software and/or hardware configuration data. For example, the verification module 204 may hash configuration data for the operating system executing on an electronic device 102 into one or more hash files of hash values. In certain embodiments, the verification module 204 generates a single hash value, a single file of hash values, or a plurality of files of hash values of configuration data for an electronic device 102.

The types of data collected by the verification module 204 may be a function of the compliance action that was performed. For example, if a malicious software scan is performed on the electronic device 102, the results of the scan may be collected and sent to the compliance authenticator. In some embodiments, the verification module 204 may be in communication with the compliance authenticator, which may send instructions to the verification module 204 regarding what information the verification module 204 should send to the compliance authenticator in order to run a compliance verification. For example, the verification module 204 may send operating system information to the compliance authenticator in response to receiving a request from the compliance authenticator for the operating system information.

The compliance authenticator verifies that the configuration information complies with the policy, such as by comparing the configuration information with the requirements of the policy. A portion of the verification module 204 is located on the compliance authenticator and comprises a mobile device manager (MDM). The MDM can be in communication with the electronic device 102 to send and/or receive configuration information. In a further embodiment, the MDM verifies that received configuration information complies with a policy established by an organization associated with the MDM.

In some embodiments, the MDM runs a health check on the configuration information to determine a health status of the electronic device 102. Running a health check can include performing one or more verification actions related to the configuration information. The verification actions may comprise determining applications installed on the electronic device, determining a hardware configuration for the electronic device, determining an operating system configuration for the electronic device, and/or the like. As part of the health check, the MDM may determine whether the configuration information is in compliance with the specifications of a policy established by an organization associated with the MDM. If the MDM determines that the configuration information complies with the policy, then the certificate module 206 may issue a key and/or an authentication certificate to the electronic device 102.

The certificate module 206 is configured to receive an authentication certificate, and/or an associated key, such as a public or private key, a unique identifier, a hash value, and/or the like, in response to the compliance authenticator, e.g., the verification module 204 or the MDM, verifying the configuration information complies with the policy. In some embodiments, the compliance authenticator generates a key based on a device, a configuration for a device, a department, an organization, or the like, and associates the generated key with an authentication certificate. Thus, the certificate module 206 may receive an authentication certificate, a key that corresponds to the authentication certificate, or both. In certain embodiments, in order to access resources, networks, or the like of a secure computing environment, the electronic device 102 presents the authentication certificate.

In some embodiments, the authentication certificate is valid until an expiration date specified in the authentication certificate. In certain embodiments, the expiration date comprises a short period of time, such as a predetermined number of minutes, hours, or days. Generally, in some embodiments, the short period of time is less than a week. In one embodiment, the authentication certificate is valid if it has not yet expired and the key associated with the authentication certificate is also valid. For example, the certificate module 206 may receive an authentication certificate, which includes a public key issued by an organization, and also a separate private key associated with the authentication certificate. If, in some embodiments, the private key associated with the authentication certificate is invalid (e.g., if the private key has been destroyed, deleted, modified, is out-of-date, or the like), then the authentication certificate will also be invalid or unusable, even if the authentication certificate has not expired.

The authentication certificate, in certain embodiments, comprises a digital certificate, a digital signature, and/or the like generated using a public key infrastructure (PKI). As used herein, a PKI includes a set of hardware, software, people, policies, and procedures needed to create, manage, distribute, use, store, and revoke digital certificates. In certain embodiments, a PKI is an arrangement that binds public keys with respective identities of users, organizations, entities, or the like, by means of a certificate authority (CA). Thus, as disclosed herein, the certificate module 206, in response to the verification module 204 verifying that an electronic device 102 complies with a policy, may receive an authentication certificate, which may include a public key associated with the CA, and/or a corresponding key, such as a private key, from a CA associated with an organization in order to access networks, resources, or the like of a secure computing environment of the organization. Other cryptographic protocols may be used, such as simple public key infrastructure (SPKI), simple certificate enrollment protocol (SCEP), or the like.

In certain embodiments, the electronic device 102 comprises a trusted platform module (TPM). As used herein, a TPM is a secure cryptoprocessor designed to secure hardware by integrating cryptographic keys into devices, such as public/private keys associated with authentication certificates. In general, TPMs assure integrity of a platform at boot time, which provides a "root of trust," together with the BIOS for the electronic device 102. In certain embodiments, however, a TPM can record "measurements" of a configuration for an electronic device 102, such as values representing an operating system type, an operating system version, a version of an antivirus program, and/or the like. In certain embodiments, the configuration "measurements" are stored in one or more Platform Configuration Registers (PCRs), which are registers designed to provide secure storage and reporting of configuration "measurements." The stored configuration "measurements," in some embodiments, can be used to detect changes to previous configurations. For example, the verification module 204 and/or the certificate module 206 may determine configuration values, such as hash values, for an operating system type, an operating system version, and/or the like, and store the determined values in the PCRs.

In certain embodiments, the certificate module 206 stores the key associated with the authentication certificate, such as a private key, in the TPM and links or binds access, use, or the like of the key to one or more values in the PCRs. For example, the certificate module 206 may store a private key in the TPM and may make the private key only accessible or usable if the values in the PCRs correspond to predetermined values, which ensures that the configuration of the electronic device 102 has not changed or been modified. In certain embodiments, the certificate module 206 generates the key on the electronic device 102 and stores the generated key in the TPM. In some embodiments, the key is received by the certificate module 206, from a CA or MDM associated with an organization, for example, and is stored in the TPM.

However, if the configuration of the electronic device 102 does change during a current session (e.g., since the last boot), causing a change in the configuration values stored in the PCRs, the key becomes unusable or invalid. In one embodiment, the certificate module 206 generates a new key based on the modified configuration, i.e., based on the new values stored in the PCRs, when the electronic device 102 is being updated under management control, and stores the newly generated key in the TPM. In some embodiments, described below with regard to the compliance module 304, if the compliance module 304 determines that the electronic device 102 has performed an unauthorized action during a current session (e.g., since the last boot), the compliance module 304 may modify or force an update to one or more values in the PCRs such that the key becomes unusable or invalid. For example, the compliance module 304 may update the PCRs with values that reflect the unauthorized configuration, invalid values (such as all zeros or ones), or the like. In this manner, the key stored in the TPM becomes inaccessible or unusable because the configuration values in the PCRs do not match the expected configuration values for the electronic device 102.

In some embodiments, however, the certificate module 206 may disable, expire, or otherwise invalidate or make unusable a key for the next boot sequence for the electronic device 102. For example, if a certificate has expired, the certificate module 206 may invalidate or disable use of the key for the next boot. In one embodiment, in order to invalidate the key stored in the TPM, the key is evicted from the TPM, i.e., is overwritten or otherwise erased from the TPM, and one or more configuration values that are stored in the PCRs are modified. Additionally, in such an embodiment, the certificate module 206 deletes a key file that represents, or is otherwise associated with, the key and is stored external to the TPM, such as an encrypted key blob, or the like. In some embodiments, the certificate module 206 modifies a configuration setting of the electronic device 102 that the verification module 204 detects on the next boot and causes one or more values stored in the PCRs to be modified, and, accordingly, causes the key to be unusable because the configuration values in the PCRs do not match the predetermined configuration values.

In certain embodiments, the authentication certificate received by the certificate module 206 is associated with an organization, a device, a task, and/or the like. The authentication certificate, in some embodiments, may be used to authorize access to a particular resource, network, file, database, and/or the like of a secure computing environment. In one embodiment, the authentication certificate sets the access limits on what resources the electronic device 102 may access. For example, an authentication certificate may only be valid until an electronic device 102 downloads a particular file from a server 108. After the download is complete, the certificate module 206 may determine that the file was successfully downloaded and invalidate the authentication certificate, for example, by deleting the private key associated with the authentication certificate. The authentication certificate may not be used to access other files, folders, systems, and/or the like, unless specified by the authentication certificate.

The certificate module 206 may receive an authentication certificate that expires after a predetermined period of time. For example, the authentication certificate may be valid for a short, predetermined duration, such as one hour, one day, one week, or the like. The certificate module 206 may expire the certificate after the expiration of the predetermined period of time. Expiring the authentication certificate, as used herein, invalidates the authentication certificate such that the electronic device 102 that received the authentication certificate is denied access to resources, networks, or the like of a computing system that may have been accessible with the authentication certificate.

In some embodiments where the authentication certificate is associated with a particular task, the certificate module 206 may receive an authentication certificate that is invalidated upon completion of the task. For example, an authentication certificate may grant an airplane maintenance laptop access to a secure network on an airplane in order to run a status check of the network. After the status check is completed, the certificate module 206 may invalidate the authentication certificate, for example, by deleting the key associated with the authentication certificate.

In a further embodiment, the certificate module 206 may receive an authentication certificate that is valid for a predetermined period of time between performances of compliance actions. In certain embodiments, the expiration period is determined by the policy associated with the device 102. For example, where a compliance action for a device 102 comprises connecting to an authorized network every 24 hours in order to verify the compliance status of the device 102, the authentication certificate may only be valid for 24 hours, as defined by the policy. In this manner, the device 102 may be required to perform the compliance action in order to maintain the validity of its authentication certificate.

In certain embodiments, after the authentication certificate has expired on the electronic device 102, or the certificate's associated key has been deleted, the certificate module 206 may issue a new authentication certificate and/or key to the electronic device 102 in response to the action module 202 detecting a new compliance action and the verification module 204 verifying that a configuration for the electronic device 102 complies with a policy. Thus, an electronic device 102 may continue to receive authentication certificates and/or corresponding keys for an organization as long as the electronic device 102 performs a compliance action that validates its configuration complies with a policy for the organization.

In some embodiments, a portion of the certificate module 206 is located on a certificate issuing device, such as a certificate authority device for an organization. In such an embodiment, the certificate module 206 determines the parameters of the authentication certificate (e.g., whether the authentication certificate is associated with a device and/or task), including an amount of time before the authentication certificate expires (e.g., based on the device 102, an organizational policy, etc.), and issues the authentication certificate and/or its associated key in response to the verification module 204 verifying that the configuration information for a device 102 complies with a policy.

In certain embodiments, the certificate module 206 digitally signs the authentication certificate with the unique digital signature of an associated organization, such as a public or private key for the organization. For example, the certificate module 206 may digitally sign the authentication certificate with the digital signature for an airline such that any device 102 seeking access to a resource, such as a network or computer, on the airline's computing system may be required to have an authentication certificate signed with the unique digital signature for the airline. In one embodiment, the certificate module 206 uses a PKI to digitally sign the certificate with an organization's unique digital signature, which may include the organization's public key.

Figure 3:
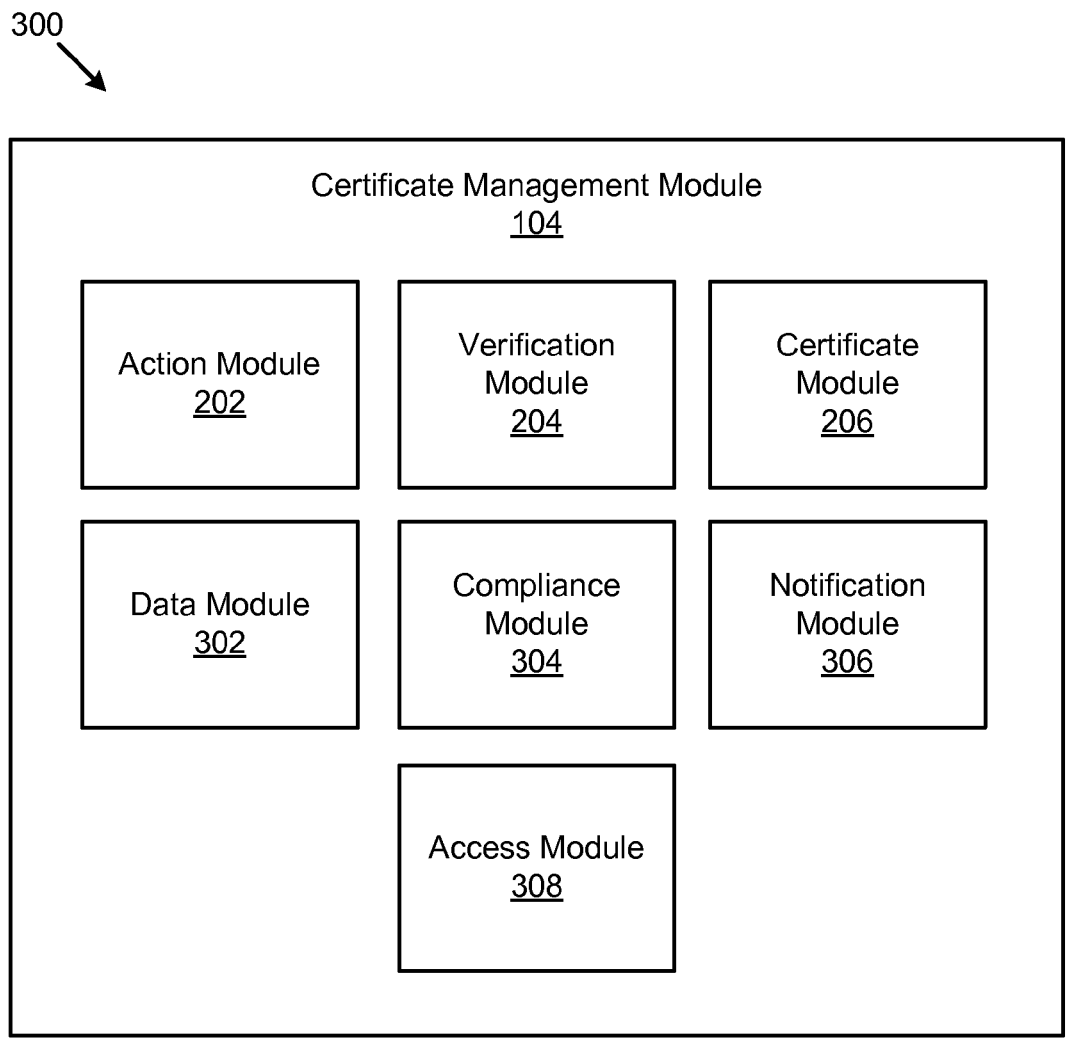
FIG. 3 is a schematic block diagram illustrating one embodiment of another module for enforcing policy compliance on a device.

FIG. 3 depicts another embodiment of a module 300 for enforcing policy compliance on a device. The module 300 includes an implementation of a certificate management module 104. The certificate management module 104 includes an action module 202, a verification module 204, and a certificate module 206, which may be substantially similar to the action module 202, the verification module 204, and the certificate module 206 described above with reference to the module 200 of FIG. 2. The certificate management module 104 of the module 300, in one embodiment, also includes a data module 302, a compliance module 304, a notification module 306, and an access module 308, which are described in more detail below.

The data module 302 is configured to receive configuration data from an electronic device 102 in response to detecting a compliance action performed on the electronic device 102. The data module 302 is communicatively coupled to the electronic device 102 through a data network 106. Further, the data module 302 can be located on an MDM for an organization and receives configuration data as specified by the MDM. For example, the MDM, or a verification module 204 located on the MDM, may specify the types of configuration data that the data module 302 should expect to receive, such as operating system configuration information, software/hardware configuration information, and/or the like.

In such an embodiment, the data module 302 filters out configuration data that is received, but is not a type of information expected by the verification module 204. For example, the data module 302 may filter out application configuration information from received configuration data in response to the MDM only requesting operating system configuration data. In this manner, the verification module 204 only receives configuration information that it requests.

In a further embodiment, the data module 302 formats the received configuration information into a general format such that it can be read, processed, analyzed, or the like, by the verification module 204. The format of the configuration information may refer to the order in which information is received, the types of information received, the format in which the information is received, and/or the like. For example, the verification module 204 may generate one or more hash files based on configuration data received as one or more flat text files, or the like.

The data module 302 may format the received configuration information into a general format, such as a collection of hash files, because the configuration information may be received in a variety of formats from the electronic devices 102. As described above, the electronic devices 102 may each comprise different operating systems, applications, hardware configurations, and/or the like, and, therefore, the configuration information received from different electronic devices 102 may be formatted differently. For example, operating system configuration data received from an electronic device 102 executing an instance of a Linux operating system may be formatted differently than operating system configuration data received from an electronic device 102 executing an instance of Microsoft Windows®.

In one embodiment, the compliance module 304 is configured to determine one or more authorized actions for an electronic device 102. In some embodiments, the compliance module 304 maintains a "whitelist" of authorized, accepted, approved, recognized, or the like, actions that an electronic device 102 is allowed to perform. In certain embodiments, the compliance module 304 maintains a "blacklist" of unauthorized actions that an electronic device 102 is not allowed to perform.

In certain embodiments, the compliance module 304 determines the authorized actions based on the types of electronic devices 102 being used. For example, a maintenance laptop for an airplane may only be allowed to connect to networks within a predetermined IP address range or wireless networks that are on a predefined list of authorized wireless networks (e.g., a list of authorized service set identifiers (SSIDs), MAC addresses, or the like), while a company-issued smart phone for a pilot of the airplane may only be allowed to connect to networks within a different predetermined IP address range and/or predetermined cellular data networks.

In some embodiments, the compliance module 304 incorporates the one or more authorized actions into the policy. A portion of the compliance module 304, in certain embodiments, may be located on an MDM and may communicate the policy, whitelist, blacklist, and/or the like, which includes the list of authorized/unauthorized actions, to an electronic device 102. In certain embodiments, a portion of the compliance module 304 may be located on the electronic device 102 in the form of a policy checker, or the like, which receives the policy from the MDM and installs or stores the policy on the electronic device 102, updates a current policy on the electronic device 102, or the like. In certain embodiments, the compliance module 304 receives an updated policy from the MDM in response to the compliance action. For example, if the compliance action includes connecting to a network and communicating with the MDM, the MDM may send the electronic device 102 the most up-to-date version of the policy.

In such an embodiment, the compliance module 304 maintains the policy locally on the electronic device 102, which allows the compliance module 304 to enforce the policy requirements on the electronic device 102. Thus, if an electronic device 102 has been issued an authentication certificate, but becomes not compliant with the policy, the compliance module 304 may invalidate, or otherwise disable use of the authentication certificate. In certain embodiments, the compliance module 304 invalidates the authentication certificate by deleting the key associated with the authentication certificate. The electronic device 102 may thereafter not be granted access to a secure resource because of its invalidated authentication certificate, via deletion of the key associated with the authentication certificate, and may need to perform a compliance action again in order to be issued a new authentication certificate and/or key.

In some embodiments, the electronic device 102 becomes non-compliant with the policy, after being issued an authentication certificate, by performing an unauthorized action, e.g., an action that is not specified as an authorized action on a "whitelist," which may include connecting to an unauthorized network, installing an unauthorized application, executing an application at an unauthorized location, and/or the like.

In one embodiment, the compliance module 304 determines whether a configuration of the electronic device 102 has been modified. For example, the compliance module 304 may determine whether an application or hardware has been installed or uninstalled. In certain embodiments, after a configuration of the electronic device 102 has been changed, the compliance module 304 may determine whether the configuration of the device 102 is still in compliance with the policy. If the new configuration is not compliant with the policy, the compliance module 304 invalidates the authentication certificate, e.g., by deleting the key associated with the certificate, and the electronic device 102 may need to perform another compliance action in order to receive a new authentication certificate and/or key.

The notification module 306, in one embodiment, is configured to send messages to the electronic device 102 from the MDM, CA, and/or another resource on an organization's secure computing system. For example, the notification module 306 may send compliance check notifications, application installation update notifications, policy update notifications, and/or the like. In some embodiments, the notification module 306 receives and presents a message on the electronic device 102 that the electronic device 102 is not in compliance with the policy in response to the compliance module 304 invalidating the authentication certificate, e.g., by deleting the key (such as a private key) associated with the authentication certificate. In certain embodiments, the notification module 306 presents a message that the authentication certificate is expired, has expired, or is about to expire, such that a user may prepare or perform an appropriate compliance action in order to receive a new authentication certificate, a new key, and/or extend the lifetime of the current authentication certificate.

The access module 308 is configured to present the authentication certificate, including the public key for the authentication certificate, for the electronic device 102 to a secure resource of a computing system. The secure resource may verify the validity of the authentication certificate, using PKI for example, and may grant the electronic device 102 access to the secure resource. In certain embodiments, the access that is granted is a function of the authentication certificate. For example, the authentication certificate may specify that the electronic device 102 may only have access to certain folders, files, databases, applications, and/or the like.

In one embodiment, the secure resource comprises a secure resource for an airplane computing system. For example, the secure resource may comprise a server located on an airplane that is accessible to certain electronic devices 102, such as maintenance devices, that present a valid authentication certificate. The secure resource may comprise various secure resources of a computing system for an organization such as a hospital, business, law firm, online retailer, and/or the like. The secure resource may comprise sensitive or classified data that is only accessible to electronic devices 102 that present a valid authentication certificate, via the access module 308, which verifies that the electronic device 102 is compliant with a policy for the organization.

Figure 4:
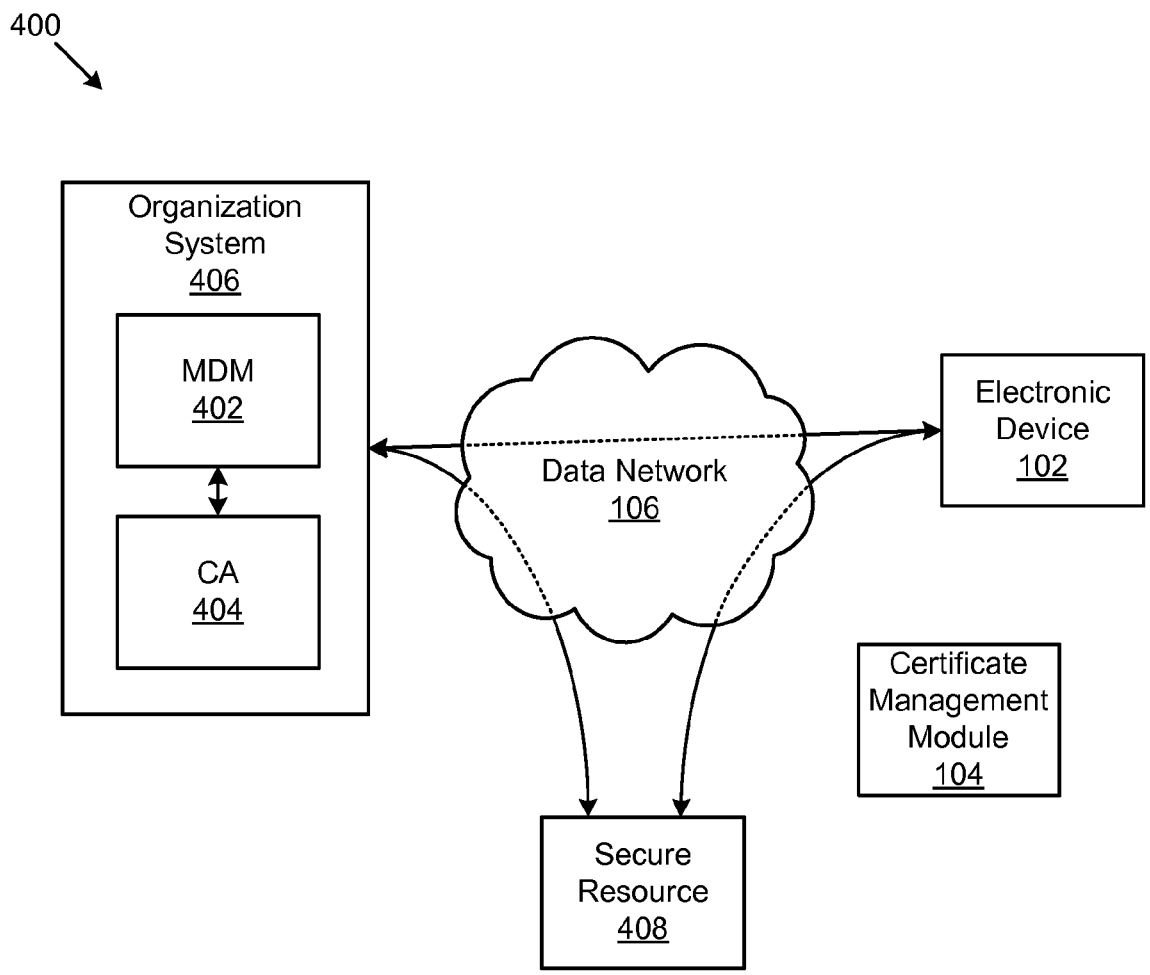
FIG. 4 is a schematic block diagram illustrating one embodiment of a system for enforcing policy compliance on a device.

FIG. 4 depicts one embodiment of a system 400 for enforcing policy compliance on a device. The system 100 includes an computer system for an organization system 406, which includes a mobile device manager (MDM) 402 and a certificate authority (CA) 404, a data network 106, an electronic device 102, and a secure resource 408. The organization system 406 may include a computer system for an airline, the secure resource 408 may include a resource on an airplane controlled by the airline, and the electronic device 102 may include a maintenance laptop, or other similar device, managed by the airline.

In certain embodiments, an electronic device 102 may request access to the secure resource 408 via the data network 106. The secure resource 408 may check whether the electronic device 102 has a valid authentication certificate and key associated with the authentication certificate. In one embodiment, if the secure resource 408 (e.g., the verification module 204 located on the secure resource 408) determines that the electronic device 102 does not have a valid authentication certificate, then the electronic device 102 may be denied access to the secure resource 408. For example, the electronic device 102 may be denied access to a network, a computer, and/or the like.

In some embodiments, the certification module 206 located on the device 102 attempts to receive a different authentication certificate from the organization system 406 in response to storing an invalid certificate and/or key, in response to a key being deleted or otherwise make unusable, or the like. However, in certain embodiments, the device 102 may not be in communication with the organization system 406 for a predetermined period of time. Similarly, if a device 102 has a valid authentication certificate, the certificate may only be valid for a short period of time and may request a new authentication certificate and/or key when the device 102 can communicate with the organization system 406.

For example, in a situation where an electronic device 102 is a maintenance device and the secure resource is a resource of a secure airplane system, the device 102 may lose communication with the organization system 406 while the airplane is flying and may not be able to communicate with the organization system 406 until the airplane is on the ground or within a close proximity to a network connected to the organization system 406. In response to reconnecting with the organization system 406, the electronic device 102 may perform a compliance action in order to verify that it is in compliance with the organization's policy to receive a different authentication certificate and/or a different key.

In order to receive an authentication certificate, the organization system 406 may determine whether the electronic device 102 is in compliance with an organizational policy. The certificate management module 104, in certain embodiments, enforces policy compliance on an electronic device 102 such that the electronic device 102 may receive an authentication certificate and/or its associated key. To receive an authentication certificate, a compliance action associated with the electronic device 102 is performed, such as registering the device with the MDM 402, connecting to an authorized network associated with the organization system 406, executing antivirus software on the electronic device 102, and/or the like.

An action module 202 detects performance of a compliance action associated with the electronic device 102 and initiates a verification process to determine whether the electronic device is in compliance with a policy. In some embodiments, configuration information for the electronic device 102 is sent to the organization system 406 by a verification module 204 to be analyzed. The configuration information may include operating system configuration data, application configuration data, hardware configuration data, and/or the like. In some embodiments, the configuration data is received by the MDM 402, which determines whether the configuration information is in compliance with the policy.

If the MDM 402, which in certain embodiments includes a portion of the verification module 204, determines that the configuration information complies with the policy, the certificate module 206, which may be located on the CA 404, issues an authentication certificate and/or a corresponding key, such as a private key, to the electronic device 102. The authentication certificate, together with its corresponding key, may then be used to access the secure resource 408. The certificate module 206 may issue an authentication certificate that expires after a short, predetermined period of time, such as a few hours, a few days, a few weeks, or the like. In this manner, the certificate management module 104 ensures that the electronic device 102 frequently checks that its configuration is compliant with the policy for the organization. In certain embodiments, an organization may modify its policy often and, therefore, it may be beneficial to require an electronic device 102 to have its configuration checked for compliance on a regular basis in order to prevent unauthorized devices from accessing secure resources using an out-of-date or otherwise invalid authentication certificate. Moreover, using certificates that are only valid for a short time period reduces the time that a stolen or misappropriated device 102 would have access to secure resources.

Figure 5:
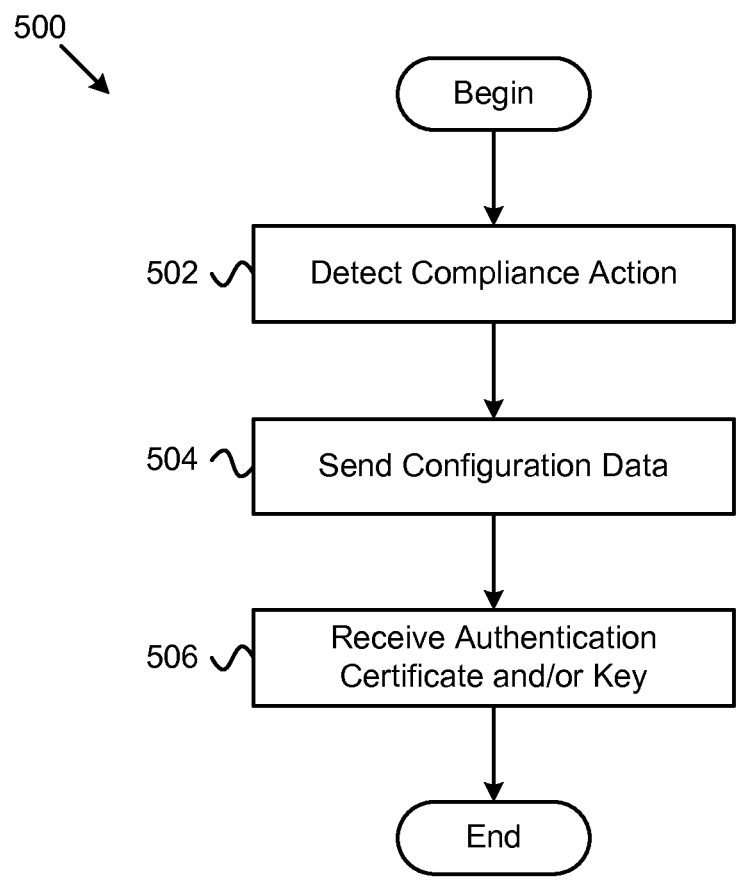
FIG. 5 is a schematic flow diagram illustrating one embodiment of a method for enforcing policy compliance on a device.

FIG. 5 depicts one embodiment of a method 500 for enforcing policy compliance on a device. The method 500 begins and an action module 202 detects 502 a compliance action associated with an electronic device 102. The compliance action initiates verification that the electronic device 102 is in compliance with a policy.

A verification module 204 sends 504 configuration information for the electronic device to a compliance authenticator in response to the compliance action. In one embodiment, the compliance authenticator verifies that the configuration information complies with the policy. A certificate module 206 receives 506 an authentication certificate and a corresponding key for the certificate in response to the compliance authenticator verifying the configuration information complies with the policy. The authentication certificate expires after a predetermined period of time, and the method 500 ends.

Figure 6:
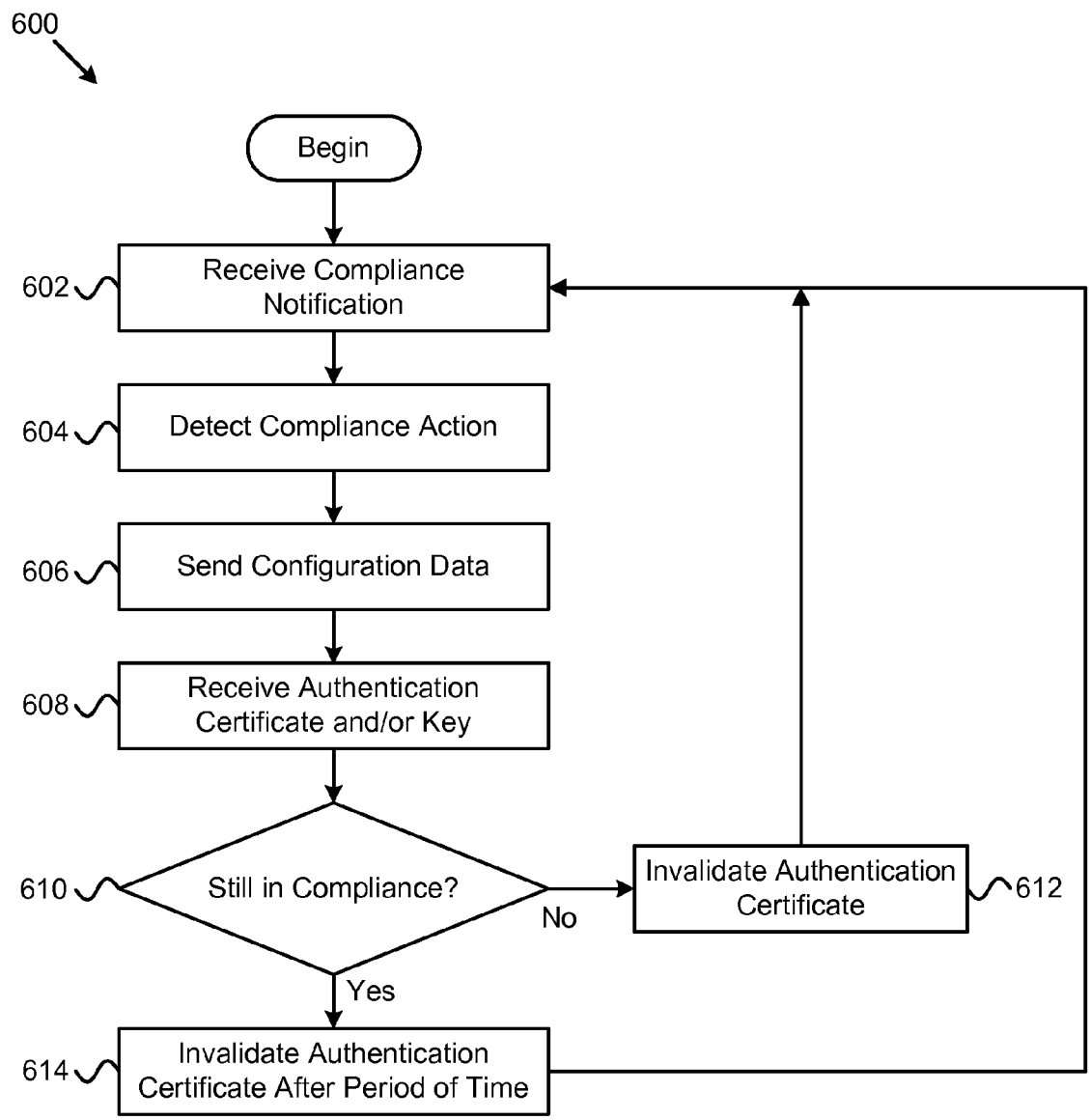
FIG. 6 is a schematic flow diagram illustrating one embodiment of another method for enforcing policy compliance on a device.

FIG. 6 depicts one embodiment of another method 600 for enforcing policy compliance on a device. The method 600 begins and a notification module 306 receives 602 a compliance notification that an electronic device 102 is not compliant with a policy. An action module 202 detects 604 a compliance action associated with the electronic device 102, which initiates verification that the electronic device 102 is in compliance with a policy.

The verification module 204 sends 606 configuration data for the electronic device to a compliance authenticator in response to the compliance action, which is then verified by the compliance authenticator to determine whether the configuration information complies with the policy. A certificate module 206 receives 608 an authentication certificate and its corresponding key in response to the compliance authenticator verifying the configuration information complies with the policy. The authentication certificate is a temporary certificate that expires after a predetermined period of time, such as a couple of hours, a couple of days, a couple of weeks, etc.

A compliance module 304 determines 610 whether the electronic device 102, after having received the authentication certificate, is still in compliance with the policy. The compliance module 304 may determine 610 whether the electronic device 102 performs an unauthorized action, e.g., an action that has not been authorized by the organization such as connecting to an unauthorized network, executing an unauthorized application, and/or the like, or whether the configuration for the electronic device 102 has changed such that it is no longer compliant with the policy. If the compliance module 304 determines 610 that the electronic device 102 has performed an unauthorized action, e.g., an action not listed on a "whitelist" of authorized actions, or that its configuration has been modified, the compliance module 304 invalidates 612 the authentication certificate, e.g., by deleting the private key associated with the certificate, and the notification module 306 receives 602 a compliance notification that the electronic device 102 is not in compliance with the policy.

If the compliance module 304 determines 610 that the electronic device 102 is still in compliance with the policy, the compliance module 304 invalidates 614 the authentication certificate after the predetermined period of time specified on the authentication certificate, e.g., after the authentication certificate expires. The notification module 306 receives 602 a compliance notification that it is time to perform a new compliance action, and the method 600 ends.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions, etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method, comprising:
    detecting a compliance action associated with an electronic device, the compliance action initiating verification that the electronic device is in compliance with a policy;
    sending configuration information for the electronic device to a compliance authenticator in response to the compliance action, the compliance authenticator verifying that the configuration information complies with the policy;
    receiving an authentication certificate in response to the compliance authenticator verifying the configuration information complies with the policy, the authentication certificate expiring after a predetermined period of time;
    determining, from the policy, a list of one or more predetermined actions that the electronic device is authorized to perform;
    determining the electronic device violated the policy in response to determining the electronic device performed an unauthorized action not on the list of the one or more predetermined actions; and
    invalidating the authentication certificate in response to the electronic device becoming not compliant with the policy.

2. The method of claim 1, wherein invalidating the authentication certificate comprises deleting a key associated with the authentication certificate.

3. The method of claim 1, further comprising accessing a secure resource of a computer system for an organization in response to the authentication certificate for the electronic device being validated.

4. The method of claim 3, wherein the organization comprises an airline and the electronic device comprises a maintenance device managed by the airline, the secure resource accessed by the maintenance device comprising a secure resource of an airplane.

5. The method of claim 1, further comprising storing a key for the authentication certificate in a trusted platform module (TPM) of the electronic device.

6. The method of claim 5, further comprising storing one or more configuration values for the electronic device in the TPM, wherein the key for the authentication certificate is usable in response to stored configuration values matching predetermined configuration values for the electronic device.

7. The method of claim 6, further comprising storing one or more of the key for the authentication certification and the one or more configuration values for the electronic device in one or more platform configuration registers (PCRs) associated with the TPM.

8. The method of claim 7, further comprising determining a configuration of the electronic device and updating the one or more configuration values stored in the PCRs in response to detecting the electronic device performed an unauthorized action.

9. The method of claim 1, wherein the compliance authenticator comprises a mobile device manager (MDM), the MDM configured to run a health check on the configuration information in order to verify the configuration information complies with the policy.

10. The method of claim 1, wherein the predetermined period of time is a function of a predefined amount of time for the electronic device to complete a task associated with the authentication certificate.

11. The method of claim 1, wherein the compliance action comprises one or more of:
    connecting to an authorized network;
    registering the electronic device with the compliance authenticator;
    installing a compliance application; and
    scanning the electronic device for malicious applications.

12. The method of claim 1, wherein the configuration information comprises one or more of:

information associated with applications installed on the electronic device;

information associated with a hardware configuration of the electronic device; and information associated with an operating system of the electronic device.

13. The method of claim 1, wherein the configuration information comprises one or more hash values, the one or more hash values being generated based on a configuration of the electronic device.

14. The method of claim 1, further comprising presenting a message on the electronic device that the electronic device is not in compliance with the policy, the message being presented in response to one of expiration of the authentication certificate and deletion of a key associated with the authentication certificate.

15. The method of claim 1, wherein an unauthorized action comprises one or more of:

connecting to an unauthorized network;

installing an unauthorized application on the electronic device; and executing an unauthorized application on the electronic device.

16. An apparatus, comprising:

a data module configured to receive configuration information associated with an electronic device in response to detecting a compliance action executed by the electronic device;

a verification module configured to verify that the configuration information complies with a policy;

a certificate module configured to issue an authentication certificate to the electronic device in response to verifying that the configuration information complies with the policy, the authentication certificate expiring after a predetermined period of time; and a compliance module configured to determine a list of one or more predetermined actions that the electronic device is authorized to perform, wherein the policy comprises the one or more predetermined actions, and to invalidate the authentication certificate in response to determining the electronic device performed an unauthorized action not on the list of the one or more predetermined actions.

17. The apparatus of claim 16, wherein the compliance module is further configured to update the policy and send the updated policy to the electronic device.

18. The apparatus of claim 16, wherein the verification module comprises a mobile device manager (MDM), the MDM configured to run a health check on the configuration information in order to verify the configuration information complies with the policy.

19. The apparatus of claim 18, wherein the health check comprises performing one or more verification actions related to the configuration information, the verification actions comprising:

determining applications installed on the electronic device;

determining a hardware configuration for the electronic device; and determining an operating system configuration for the electronic device.

20. The apparatus of claim 16, wherein the certificate module comprises a certificate authority for an airline that created the policy, the certificate authority issuing an authentication certificate that authorizes the electronic device to access a secure resource of an airplane computer system.

21. The apparatus of claim 16, wherein the predetermined period of time is a function of a predefined amount of time for the electronic device to complete a task associated with the authentication certificate.

22. A computer program product comprising a non-transitory computer readable storage medium storing computer usable program code executable to perform operations, the operations comprising:

detecting a compliance action for an electronic device, the compliance action associated with verifying the electronic device is in compliance with a policy;

sending configuration information for the electronic device to a compliance authenticator in response to the compliance action, the compliance authenticator verifying that the configuration information complies with the policy;

receiving an authentication certificate in response to the compliance authenticator verifying the configuration information complies with the policy, the authentication certificate expiring after a predetermined period of time;

determining, from the policy, a list of one or more predetermined actions that the electronic device is authorized to perform;

determining the electronic device violated the policy in response to determining the electronic device performed an unauthorized action not on the list of the one or more predetermined actions; and invalidating the authentication certificate in response to the electronic device becoming not compliant with the policy.

* * * * *